(12) United States Patent
Pointner et al.

(10) Patent No.: US 10,728,241 B2
(45) Date of Patent: Jul. 28, 2020

(54) TRIAGE ENGINE FOR DOCUMENT AUTHENTICATION

(71) Applicant: Jumio Corporation, Palo Alto, CA (US)

(72) Inventors: Philipp Pointner, Vienna (AT); Attila Balogh, Vienna (AT); Reinhard Hochrieser, Linz (AT); Lukas Bayer, Vienna (AT); Ronald Streicher, Vienna (AT)

(73) Assignee: Jumio Corporation, Palo Alto, CA (US)

( * ) Notice: Subject to any disclaimer, the term of this patent is extended or adjusted under 35 U.S.C. 154(b) by 276 days.

(21) Appl. No.: 15/881,418

(22) Filed: Jan. 26, 2018

(65) Prior Publication Data

US 2019/0238533 A1 Aug. 1, 2019

(51) Int. Cl.
*H04L 29/06* (2006.01)
*G06K 9/00* (2006.01)
(Continued)

(52) U.S. Cl.
CPC .......... *H04L 63/0861* (2013.01); *G06F 21/32* (2013.01); *G06F 21/45* (2013.01); *G06F 21/566* (2013.01); *G06K 9/00268* (2013.01); *G06K 9/00288* (2013.01); *G06K 9/00469* (2013.01); *G06K 9/00892* (2013.01); *H04L 63/0853* (2013.01); *H04L 63/1433* (2013.01); *G06F 3/04842* (2013.01); *G06K 9/00456* (2013.01); *G06K 2209/27* (2013.01)

(58) Field of Classification Search
CPC ............. H04L 63/0861; H04L 63/0853; H04L 63/1433; G06F 21/32; G06F 21/45; G06F 21/602; G06F 3/04842; G06K 9/00288; G06K 9/00892; G06K 9/00456; G06K 9/00268; G06K 9/00469; G06K 2209/27
USPC ........................................................... 726/7
See application file for complete search history.

(56) References Cited

U.S. PATENT DOCUMENTS

| 8,020,763 | B1 * | 9/2011 | Kowalchyk | G06Q 20/102 235/380 |
| 9,740,926 | B2 | 8/2017 | Hagen et al. | |
| 2005/0154891 | A1 * | 7/2005 | Skipper | G07D 7/004 713/176 |

(Continued)

OTHER PUBLICATIONS

NPL Search (Year: 2019).*

(Continued)

*Primary Examiner* — Syed A Zaidi
(74) *Attorney, Agent, or Firm* — Morgan, Lewis & Bockius LLP

(57) ABSTRACT

Computer systems and methods are provided for receiving a first authentication request that includes an image of an identification document. A risk value is determined using one or more information factors that correspond to the authentication request. A validation user interface that includes the image of the identification document is displayed. A risk category that corresponds to the risk value is determined using at least a first risk threshold. In accordance with a determination that the risk value corresponds to a first risk category, a visual indication that corresponds to the first risk category is displayed. In accordance with a determination that the risk value corresponds to a second risk category, a visual indication that corresponds to the second risk category is displayed.

20 Claims, 13 Drawing Sheets

(51) Int. Cl.
*G06F 21/32* (2013.01)
*G06F 21/56* (2013.01)
*G06F 21/45* (2013.01)
*G06F 3/0484* (2013.01)

(56) References Cited

U.S. PATENT DOCUMENTS

| | | | |
|---|---|---|---|
| 2008/0162603 A1* | 7/2008 | Garg | G06F 40/186 |
| 2008/0235565 A1* | 9/2008 | Ackerman | G06F 17/2235 |
| | | | 715/205 |
| 2010/0027834 A1* | 2/2010 | Spitzig | G06K 9/00577 |
| | | | 382/100 |
| 2010/0157318 A1* | 6/2010 | Ming | G07D 7/0043 |
| | | | 358/1.1 |
| 2010/0299536 A1* | 11/2010 | Martin | G06Q 10/10 |
| | | | 713/189 |
| 2011/0119481 A1* | 5/2011 | Auradkar | G06F 21/602 |
| | | | 713/150 |
| 2011/0145580 A1* | 6/2011 | Auradkar | H04L 63/0428 |
| | | | 713/170 |
| 2014/0130127 A1* | 5/2014 | Toole | G06F 21/60 |
| | | | 726/3 |
| 2015/0163206 A1* | 6/2015 | McCarthy | G06F 21/6227 |
| | | | 713/171 |
| 2016/0104040 A1 | 4/2016 | Ragnet et al. | |
| 2017/0200247 A1* | 7/2017 | Kuklinski | G06K 7/1417 |
| 2018/0189561 A1* | 7/2018 | Bertan | G06F 21/32 |

OTHER PUBLICATIONS

NPL Search Results (Year: 2020).*
Jumio Corporation, International Search Report and Written Opinion, PCT/US2019/014300, dated Apr. 10, 2019, 10 pgs.

* cited by examiner

TRIAGE ENGINE FOR DOCUMENT AUTHENTICATION

TECHNICAL FIELD

This application relates generally to user authentication, and more particularly, to using facial image data for user authentication.

BACKGROUND

Identification and verification of remote users is important for many network communications and transactions. This is especially true with sensitive communications and important transactions when users are unacquainted and remote from each other. Traditionally, a person presents a physical identification document for inspection by an agent who compares a facial image of the identification document to the physical appearance of the person. However, the conventional mechanisms of identifying and verifying users are inconvenient and inefficient, and result in burdens for users.

SUMMARY

Accordingly, there is a need for systems and/or devices with more efficient, accurate, and intuitive methods for identification and verification of remote users and/or devices. Such systems, devices, and methods optionally complement or replace conventional systems, devices, and methods for identification and verification of remote users and/or devices.

The disclosed subject matter includes, in one aspect, a computerized method for providing a visual indication of risk category, which includes receiving a first authentication request that includes an image of an identification document. The method additionally includes determining, using one or more information factors that correspond to the authentication request, a risk value. The method additionally includes displaying, by a display of a validation device, a validation user interface that includes an image of the identification document. The method additionally includes determining, using at least a first risk threshold, a risk category that corresponds to the risk value. In accordance with a determination that the risk value corresponds to a first risk category, the display of the validation device displays a visual indication that corresponds to the first risk category. In accordance with a determination that the risk value corresponds to a second risk category, the display of the validation device displays a visual indication that corresponds to the second risk category.

In some embodiments, a system includes one or more processors, memory, and one or more programs. The one or more programs are stored in the memory and configured to be executed by the one or more processors. The one or more programs include instructions for receiving a first authentication request that includes an image of an identification document. The one or more programs additionally include instructions for determining, using one or more information factors that correspond to the authentication request, a risk value. The one or more programs additionally include instructions for displaying, by a display of a validation device, a validation user interface that includes an image of the identification document. The one or more programs additionally include instructions for determining, using at least a first risk threshold, a risk category that corresponds to the risk value. In accordance with a determination that the risk value corresponds to a first risk category, the display of the validation device displays a visual indication that corresponds to the first risk category. In accordance with a determination that the risk value corresponds to a second risk category, the display of the validation device displays a visual indication that corresponds to the second risk category.

In some embodiments, a computer readable storage medium stores one or more programs. The one or more programs comprise instructions, which when executed, cause a device to receive a first authentication request that includes an image of an identification document. The one or more programs additionally comprise instructions that cause the device to determine, using one or more information factors that correspond to the authentication request, a risk value. The one or more programs additionally comprise instructions that cause the device to display, by a display of a validation device, a validation user interface that includes an image of the identification document. The one or more programs additionally comprise instructions that cause the device to determine, using at least a first risk threshold, a risk category that corresponds to the risk value. In accordance with a determination that the risk value corresponds to a first risk category, the display of the validation device displays a visual indication that corresponds to the first risk category. In accordance with a determination that the risk value corresponds to a second risk category, the display of the validation device displays a visual indication that corresponds to the second risk category.

BRIEF DESCRIPTION OF THE DRAWINGS

So that the present disclosure can be understood in greater detail, features of various embodiments are illustrated in the appended drawings. The appended drawings, however, merely illustrate pertinent features of the present disclosure and are therefore not limiting.

In accordance with common practice, some of the drawings may not depict all of the components of a given system, method, or device. Finally, like reference numerals denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as not to unnecessarily obscure pertinent aspects of the embodiments described herein.

Figure 1:
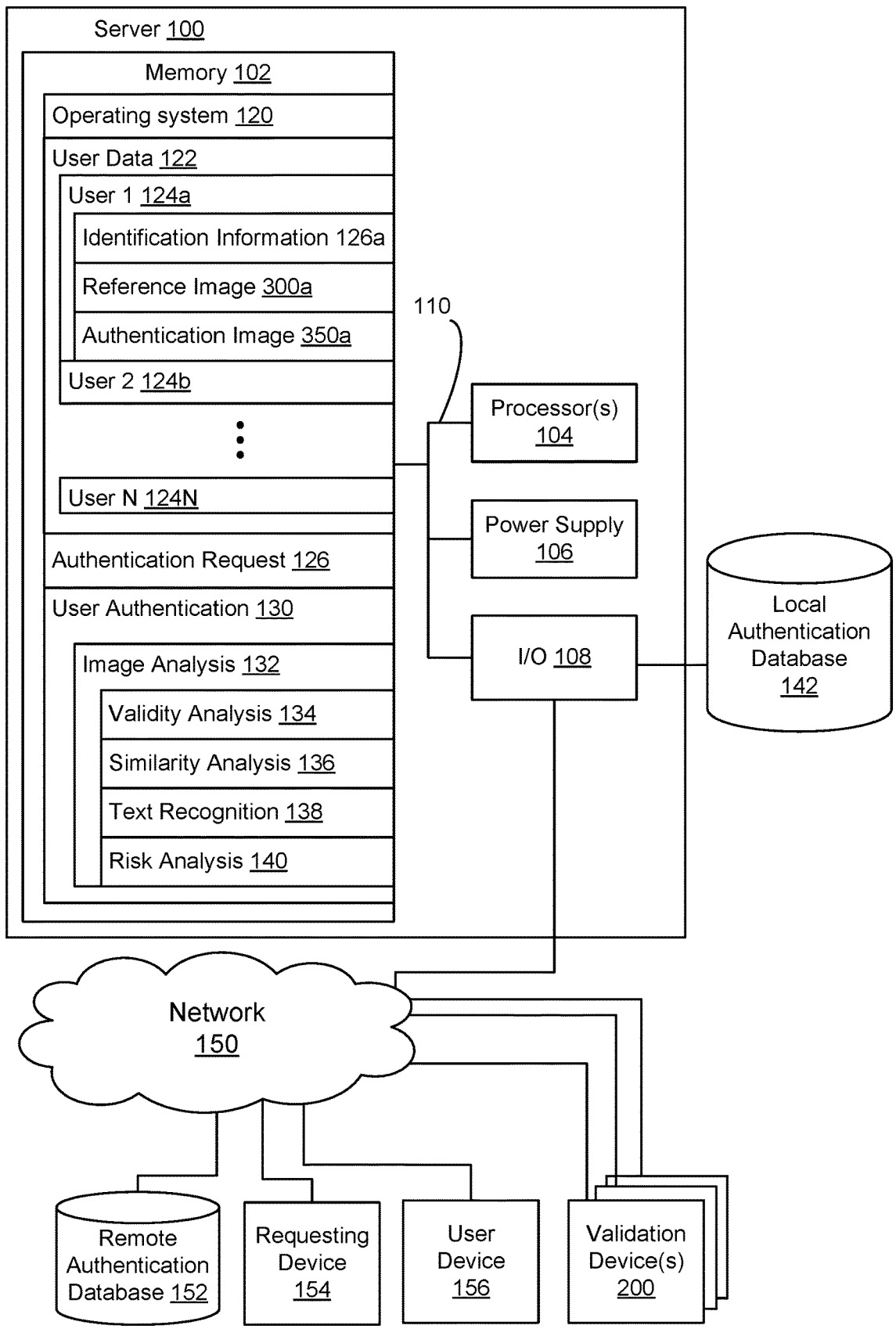
FIG. 1 is a system diagram of a computing system and its context, in accordance with some embodiments.

FIG. 1 is a system diagram of a server computing system 100, in accordance with some embodiments. The computing system 100 typically includes a memory 102, one or more processor(s) 104, a power supply 106, an input/output (I/O) subsystem 108, and a communication bus 110 for interconnecting these components.

The processor(s) 104 execute modules, programs, and/or instructions stored in the memory 102 and thereby perform processing operations.

In some embodiments, the memory 102 stores one or more programs (e.g., sets of instructions) and/or data structures, collectively referred to as "modules" herein. In some embodiments, the memory 102, or the non-transitory computer readable storage medium of the memory 102 stores the following programs, modules, and data structures, or a subset or superset thereof:

an operating system 120;
a user data module 122, which stores information, such as identification information 126 (e.g., unique identification, user name, user password, user residential information, user phone number, user date of birth, and/or user e-mail), a reference image 300a, and/or an authentication image 350b, that correspond to a respective user 124 (e.g., a first user 124a, a second user 124b . . . Nth user 124N);
authentication request storage 126; and
a user authentication module 130, which includes an image analysis module 132 (e.g., including a validity analysis module 134, a similarity analysis module 136, a text recognition module 138, and/or a risk analysis module 140).

The above identified modules (e.g., data structures and/or programs including sets of instructions) need not be implemented as separate software programs, procedures, or modules, and thus various subsets of these modules may be combined or otherwise re-arranged in various embodiments. In some embodiments, the memory 102 stores a subset of the modules identified above. In some embodiments, a remote authentication database 152 and/or a local authentication database 142 store a portion or all of one or more modules identified above (such as user data 122). Furthermore, the memory 102 may store additional modules not described above. In some embodiments, the modules stored in the memory 102, or a non-transitory computer readable storage medium of the memory 102, provide instructions for implementing respective operations in the methods described below. In some embodiments, some or all of these modules may be implemented with specialized hardware circuits that subsume part or all of the module functionality. One or more of the above identified elements may be executed by one or more of the processor(s) 104. In some embodiments, one or more of the modules described with regard to the memory 102 is implemented in the memory 202 of a validation device 200 (FIG. 2) and executed by the processor(s) 220 of the validation device 200.

In some embodiments, the I/O subsystem 108 communicatively couples the computing system 100 to one or more devices, such as a local authentication database 142, a remote authentication database 152, a requesting device 154, a user device 156, and/or a validation device(s) 200 via a communications network 150 and/or via a wired and/or wireless connection. In some embodiments, the communications network 150 is the Internet.

The communication bus 110 optionally includes circuitry (sometimes called a chipset) that interconnects and controls communications between system components.

Typically, an authentication system for processing authentication requests includes a server computer system 100 that is communicatively connected to a plurality of validation devices 200 (e.g., via a network 150 and/or an I/O subsystem 108). In some embodiments, the authentication system receives an authentication request (e.g., from a user device 156 that captures an image of a user or from a requesting device 154 that receives an image from user device 156). For example, the authentication request is a request to authenticate the identity of a user 124 (e.g., a user that is a party to a transaction or a user that is requesting access to a system or physical location). Requesting device 154 is, for example, a device of a merchant, bank, transaction processor, computing system or platform, physical access system, or another user. User device 156 is, for example, a device that includes and/or is connected to a camera, such as a personal computer or mobile device.

In some embodiments, an authentication request includes a reference image 300 (e.g., an image of an identification document for a user 124) and an authentication image 350 (e.g., an image, series of images, and/or video of the user 124 captured by a user device 156, such as a recent "selfie" of the user 124). In some embodiments, an authentication request includes an authentication image 350 and the authentication system locates a reference image 300 that corresponds to the user 124 that provided the authentication image 350. For example, user authentication module 130 searches a reference document database to locate a reference image 300 and/or user authentication module searches a user profile stored in user data 122, local authentication database 142, and/or remote authentication database 142 to locate a previously stored reference image 300. In some embodiments, the authentication system displays, by a validation device 200, a reference image 300 and authentication image 350. In some embodiments, the validation device 200 receives input that is used to determine whether authentication is successful (e.g., based on whether reference image 300 is sufficiently similar to the authentication image 350).

In some embodiments, image analysis module 132 performs image analysis on the reference image 300 (or a portion thereof, such as a portion that corresponds to a facial image) to determine whether the reference image 300 satisfies one or more reference image validity requirements (e.g., reference image 300 has sufficient quality, reference image 300 has correct fields for the type of identification document captured in reference image 300, and/or the facial image 304 is in the correct location within the identification document shown in reference image 300). In some embodiments, image analysis module 132 performs image analysis on the authentication image 350 to determine whether the authentication image 350 satisfies one or more authentication image validity requirements (e.g., authentication image 350 has sufficient quality, authentication image 350 is not cropped from an identification document, an entire identification document is not used as the authentication image 350, the authentication image 350 is not captured from a printed or displayed image, the authentication image 350 includes a single human face, and/or the authentication image 350 is not a manipulated image (e.g., an image to which filter or virtual accessory has been applied)).

In some embodiments, similarity analysis module 136 compares the reference image 300 (or the portion thereof) and authentication image 350 (or a portion thereof, such as a portion that corresponds to a facial image) to determine whether the reference image 300 and authentication image 350 satisfy one or more similarity requirements (e.g., the age difference between the face in the authentication image 350 and the face in the reference image 300 is not too great). In some embodiments, server 100 transmits identification information 126, reference image 300, and/or authentication image 350 to validation device 200.

In some embodiments, text recognition module 138 detects and/or analyzes one or more fields of text in reference image 300. For example, text recognition module 138 performs optical character recognition on detected text in reference image 300. In some embodiments, text recognition module 138 determines whether detected text in reference image 300 satisfies one or more text validity requirements (e.g., the text font matches a known font for the identification document type, the text kerning matches a known kerning for the identification document type, the text includes a number of characters that matches a known number of characters for the identification document type, and/or the text content matches identification information 126b associated with a user 124 of the identification document.)

In some embodiments, the authentication system uses risk analysis module 140 to determine a risk value that corresponds to an authentication request. A risk category is determined using the risk value. In some embodiments, the authentication displays, by the validation device 200, a visual indication of the risk category.

In some embodiments, the analysis performed by image analysis module 132, similarity analysis module 136, text recognition module 138, and risk analysis module 140 is used to determine images, image annotations, and required checks to be made by a reviewer, required information to be provided by a reviewer, and/or other information shown in validation user interface 222. In some embodiments, the analysis performed by image analysis module 132, similarity analysis module 136, text recognition module 138, and risk analysis module 140, and/or the input provided by the reviewer is used to provide a response to the authentication request (e.g., a response that includes authorization, denial, and/or risk information).

Figure 2:
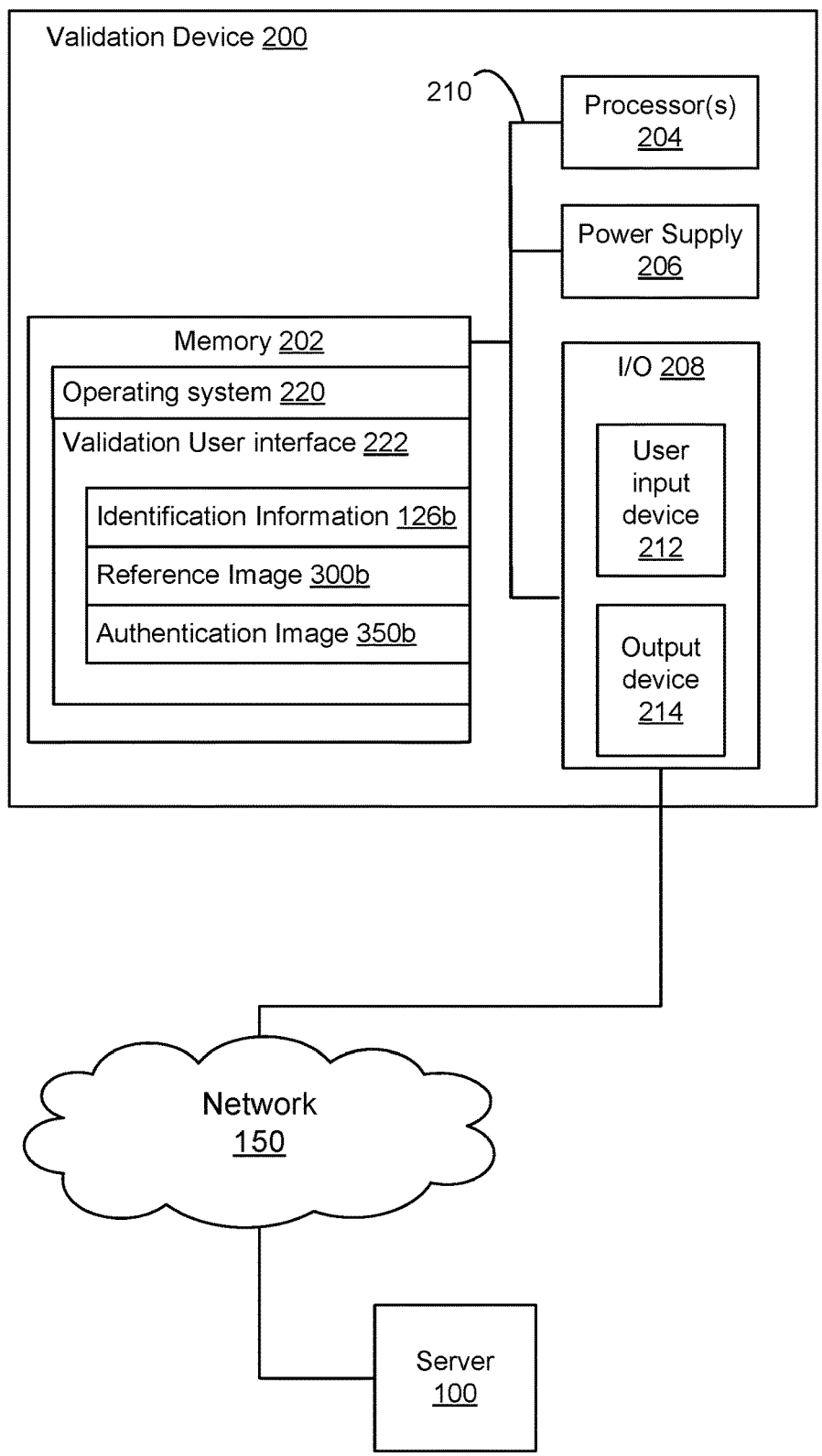
FIG. 2 is a system diagram of a verification device, in accordance with some embodiments.

FIG. 2 is a system diagram of a validation device 200, in accordance with some embodiments. A validation device is, for example, a device that displays validation information and receives validation input. The validation device 200 typically includes a memory 202, one or more processor(s) 204, a power supply 206, an input/output (I/O) subsystem 208, and a communication bus 210 for interconnecting these components.

The processor(s) 204 execute modules, programs, and/or instructions stored in the memory 102 and thereby perform processing operations.

In some embodiments, the memory 202 stores one or more programs (e.g., sets of instructions) and/or data structures, collectively referred to as "modules" herein. In some embodiments, the memory 202, or the non-transitory computer readable storage medium of the memory 202 stores the following programs, modules, and data structures, or a subset or superset thereof:
  an operating system 220; and
  a validation user interface 222, which displays information (e.g., identification information 126b for a user 124a, a reference image 300b for the user 124a, and/or an authentication image 350b for the user 124a) and/or includes one or more input controls for receiving validation input.

The above identified modules (e.g., data structures, and/or programs including sets of instructions) need not be implemented as separate software programs, procedures, or modules, and thus various subsets of these modules may be combined or otherwise re-arranged in various embodiments. Furthermore, the memory 202 may store additional modules not described above. In some embodiments, the modules stored in the memory 202, or a non-transitory computer readable storage medium of the memory 202, provide instructions for implementing respective operations in the methods described below. In some embodiments, some or all of these modules may be implemented with specialized hardware circuits that subsume part or all of the module functionality. One or more of the above identified elements may be executed by one or more of the processor(s) 204. In some embodiments, one or more of the modules described with regard to the memory 202 is implemented in the memory 102 of a server computing system 100 (FIG. 1) and executed by the processor(s) 104 of the server computing system 100.

In some embodiments, the I/O subsystem 208 communicatively couples the validation device 200 to one or more devices (e.g., user input device 212, output device 214, and/or server computer system 100) via a communications network 150 and/or via a wired and/or wireless connection. In some embodiments, a user input device 212 and/or an output device 214 are integrated with validation device 200 (e.g., a touchscreen display). In some embodiments, user input device 212 and/or output device 214 are peripheral devices communicatively connected to validation device 200. In some embodiments, a user input device 212 includes a keyboard and/or a pointer device such as a mouse, touchpad, and/or stylus. In some embodiments, output device 214 includes, for example, a display and/or a speaker.

In some embodiments, validation user interface 222, user input device 212, and/or output device 214 are incorporated into server computer system 100 (e.g., rather than being implemented in a separate validation device 200).

The communication bus 210 optionally includes circuitry (sometimes called a chipset) that interconnects and controls communications between system components.

In some embodiments, validation device 200 (or server 100) displays, by a validation user interface 222 displayed by output device 214, identification information 126, reference image 300, and/or authentication image 350. In some embodiments, a reviewer viewing validation user interface 222 provides input to validation device via user input device 212. The input provided by the reviewer includes, for example, information regarding the validity of reference image 300 (e.g., the results of one or more validity checks for reference image 300), information regarding the validity of authentication image 350 (e.g., the results of one or more validity checks for authentication image 350), and/or information regarding the similarity of reference image 300 and authentication image 350 (e.g., the results of one or more similarity checks for reference image 300 and authentication image 350).

Figure 3A:
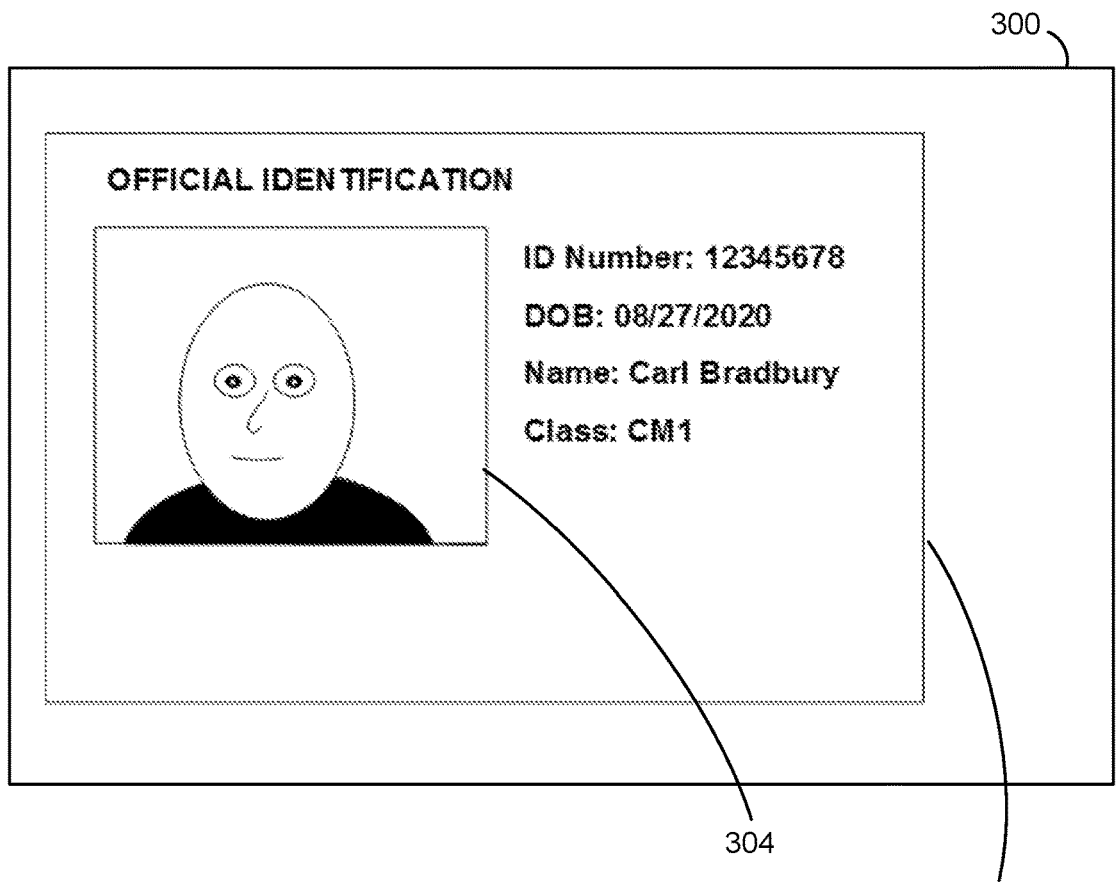
FIG. 3A illustrates a reference image, in accordance with some embodiments.

FIG. 3A illustrates a reference image 300, in accordance with some embodiments. Reference image 300 is, for example, an image of an identification document 302 that includes a facial image 304 of a user 124. For example, reference image 300 is an image of an identification card, a driver's license, a passport, a financial instrument (e.g., credit card or debit card), or a facility access card. In some embodiments, reference image 300 is stored by server 100 (e.g., as reference image 300a associated with a first user 124a), local authentication database 142, remote authentication database 152, requesting device 154, user device 156, and/or validation device 200 (e.g., as reference image 300b).

Figure 3B:
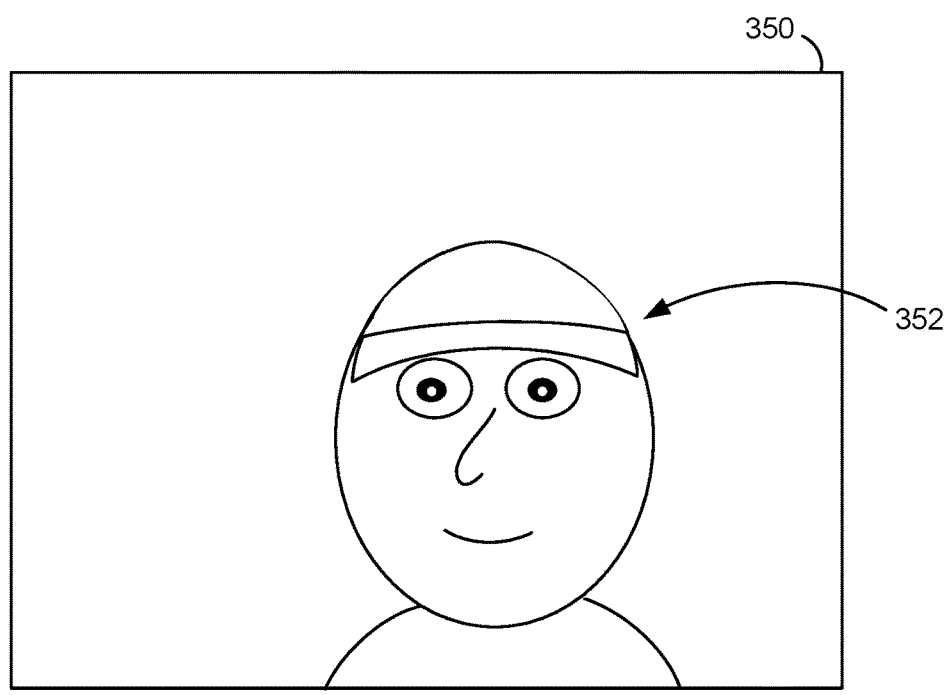
FIG. 3B illustrates an authentication image, in accordance with some embodiments.

FIG. 3B illustrates an authentication image 350 that includes a facial image 352 of the user 124, in accordance with some embodiments. For example, authentication image 350 is a "selfie" captured using user device 156. Authentication image 350 is, e.g., a still image or an image extracted from a video, received from a user device 156 or received from a requesting device 154. In some embodiments, the authentication image 350 includes a series of images or a video (e.g., used for determining that the authentication image 350 meets liveness requirements).

In some embodiments, in response to receiving an authentication request (e.g., an authentication request for a transaction), risk analysis module 140 determines a risk value using information that corresponds to the authentication request. The risk value is used to determine a risk category (e.g., low risk, medium risk, or high risk) for the authentication request. In some embodiments, one or more visual indications that correspond to the determined risk category are displayed in a validation user interface 222.

Figure 4:
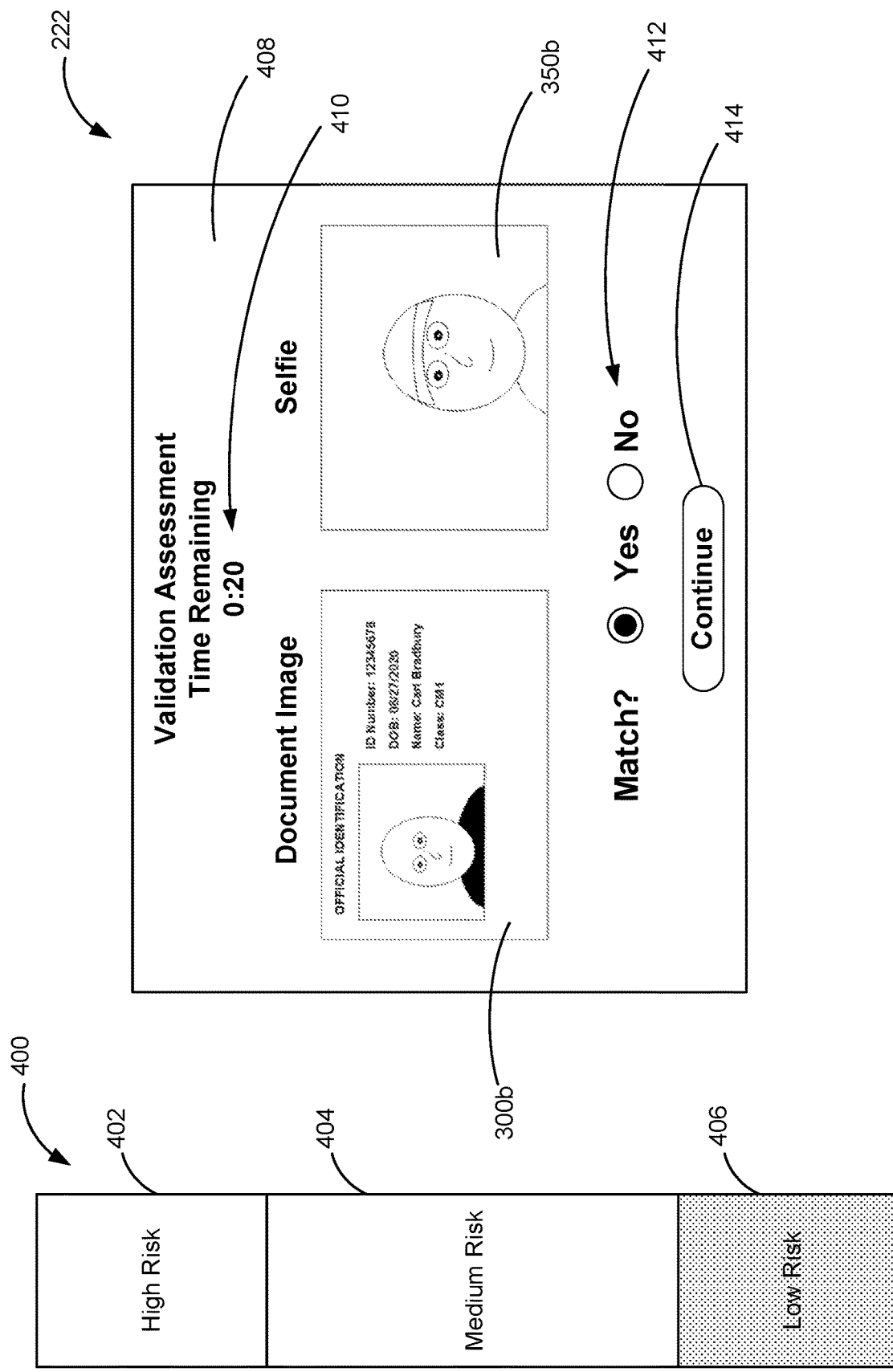
FIGS. 4-6 illustrate validation user interfaces that are displayed when authentication information displayed for validation review correspond to a low risk category, a medium risk category, and a high risk category, respectively, in accordance with some embodiments.
Figure 5:
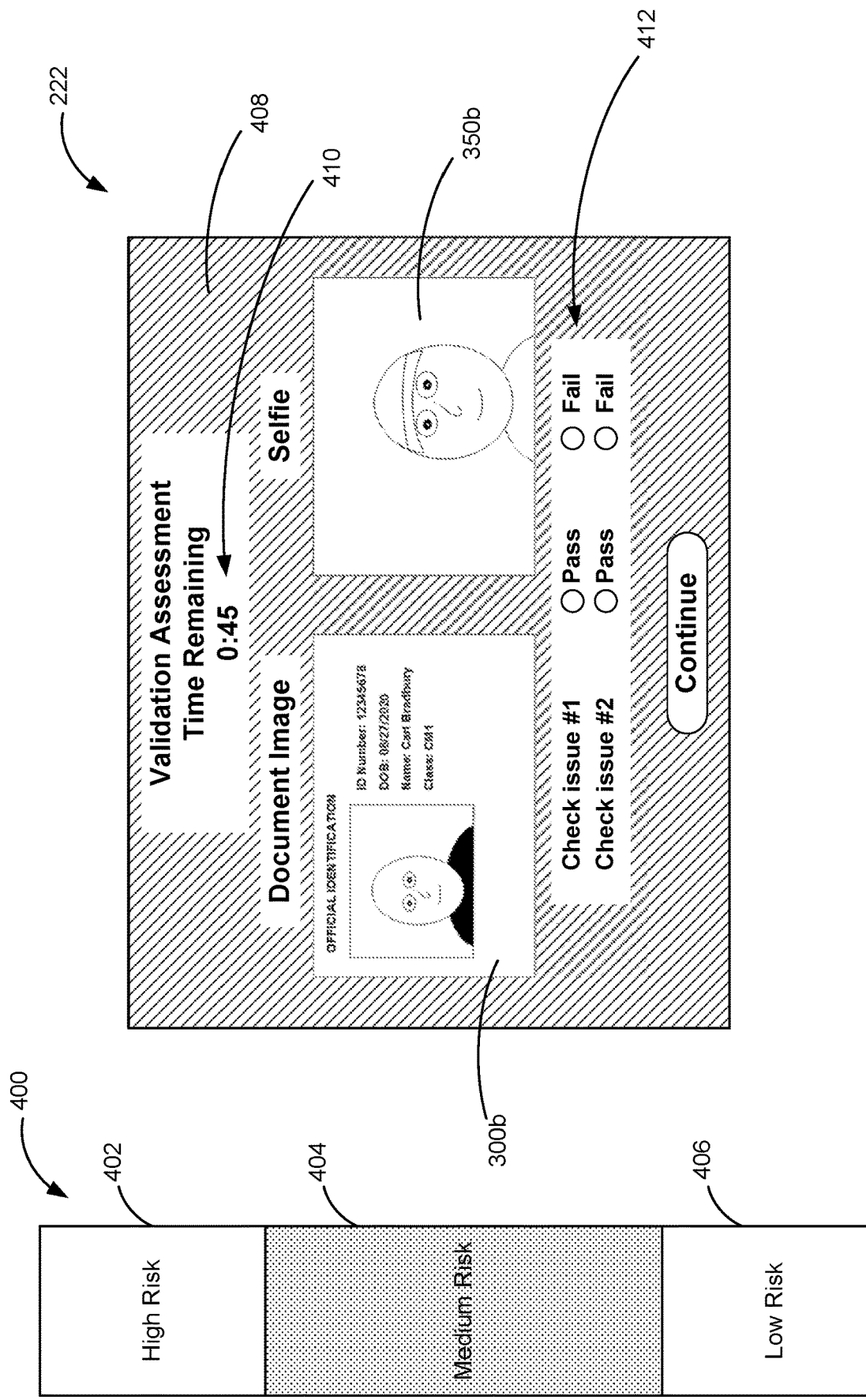
Figure 6:
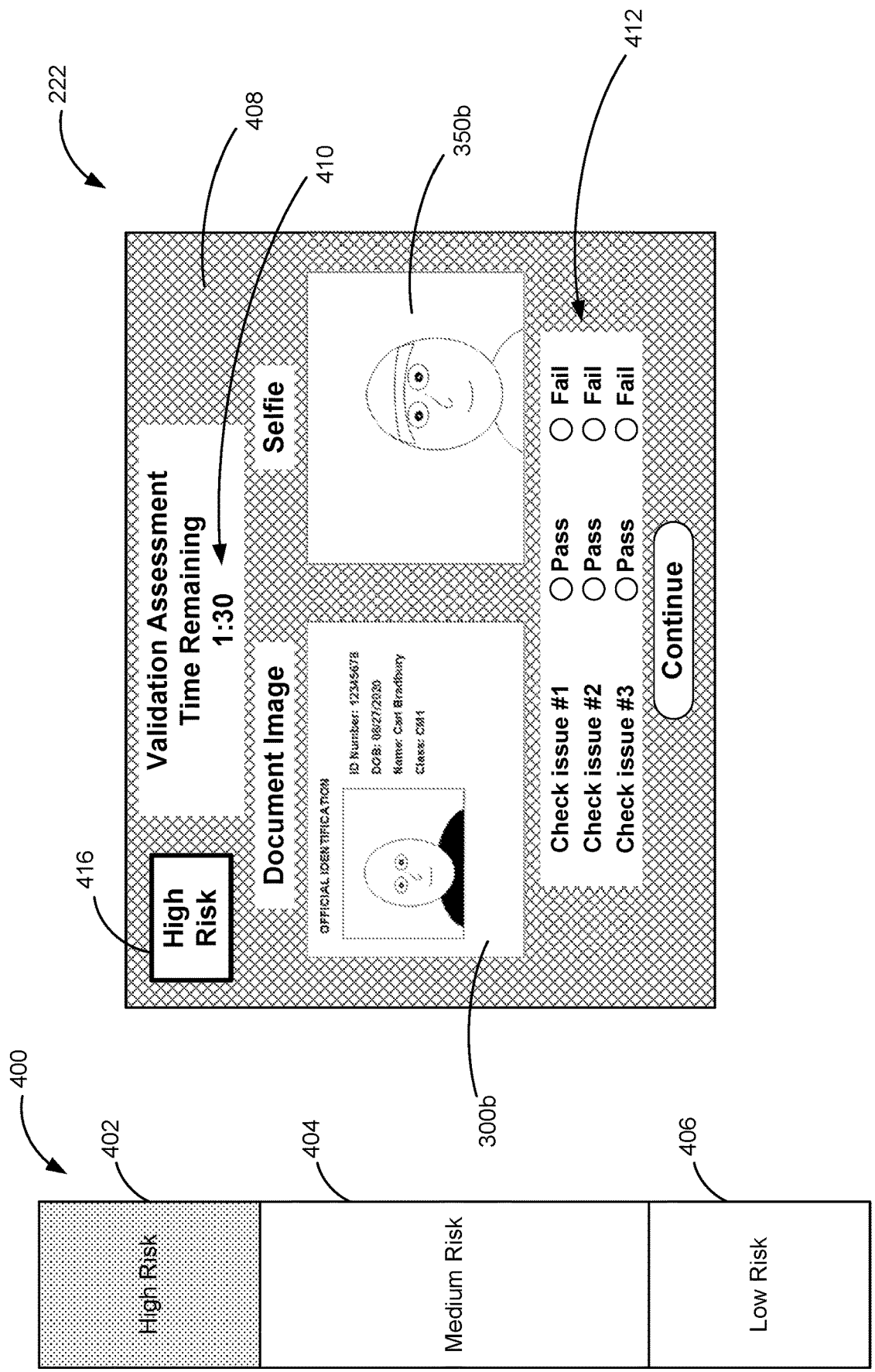

FIGS. 4-6 illustrate validation user interfaces 222 that can be displayed when the authentication information displayed for validation review correspond to a low risk category, a medium risk category, and a high risk category, respectively, in accordance with some embodiments. In FIGS. 4-6, a high risk level 402, a medium risk level 404, or a low risk level 406 is highlighted in risk indicator 400 to indicate the risk category that corresponds to the validation user interface 222.

FIG. 4 illustrates a validation user interface 222 that can be displayed to facilitate review of authentication information for a first authentication request that has been determined to be a low risk authentication request. Low risk level 406 of risk indicator 400 is highlighted to indicate that a risk value determined for the first authentication request indicates that the first authentication request is a low risk category authentication request. Validation user interface 222 can include reference image 300b and authentication image 350b (e.g., to allow a reviewer to compare the images and determine whether the images match), an allotted time value 410 (e.g., to indicate to a reviewer a total or remaining time allotted for review), a review input region 412 (e.g., displaying a prompt for a reviewer to provide an input to indicate the results of a review), and a completion control 414 (e.g., to allow a reviewer to indicate that a review is complete).

FIG. 5 illustrates a validation user interface 222 that can be displayed to facilitate review of authentication information for a second authentication request that has been determined to be a medium risk authentication request. Medium risk level 404 of risk indicator 400 is highlighted to indicate that a risk value determined for the second authentication request indicates that the second authentication request is a medium risk category authentication request. Visual indicators provided to the reviewer to indicate that the determined risk has increased to the medium risk category can include a background that is altered (e.g., the color and/or pattern of the background 408 of shown for the medium risk category authentication request is different from the background 408 shown for the low risk category authentication request of FIG. 4), an allotted time value 410 that has been altered (e.g., increased from the allotted time value 410 shown for the low risk category authentication request of FIG. 4), and an altered review input region 412 (e.g., in the medium risk category version of the validation user interface 222, multiple input prompts are displayed in review input region 412 for information regarding multiple parameters that are to be checked, whereas in the low risk category version of the validation user interface 222, review input region 412 displayed a prompt for a reviewer to input a match determination).

FIG. 6 illustrates a validation user interface 222 that can be displayed to facilitate review of authentication information for a third authentication request. High risk level 402 of risk indicator 400 is highlighted to indicate that a risk value determined for the third authentication request indicates that the third authentication request is a high risk authentication request. Visual indicators provided to the reviewer to indicate that the determined risk has increased to the high risk category can include: a background 408 that is altered (e.g., the color and/or pattern of the background 408 shown for the high risk category version of the validation user interface 222 is different from the background 408 shown for the low risk category version of the validation user interface 222 shown in FIG. 4 and the background 410 shown for the medium risk category version of the validation user interface 222 shown in FIG. 5), an allotted time value 410 that has been altered (e.g., increased from the allotted time value 410 shown for the low risk category version of the validation user interface 222 shown in FIG. 4 and the allotted time value 410 shown for the medium risk category version of the validation user interface 222 shown in FIG. 5), an altered review input region 412 (e.g., compared with the medium risk category version of the validation user interface 222 shown in FIG. 5, an increased number of input prompts are displayed for parameters that are to be checked), and an indicator 416 that can be displayed overlaying the validation user interface 222.

FIG. 7 is a flow diagram illustrating a method for providing a visual indication of risk category, in accordance with some embodiments. The method is performed by an authentication system (e.g., at a server 100 and/or a validation device 200). For example, instructions for performing the method 700 are stored in the memory 202 and executed by the processor(s) 204 of the validation device 200. In some embodiments, part or all of the instructions for performing the method are stored in the memory 102 and executed by the processor(s) 104 of the server 100. In FIG. 7, dotted outlines indicate optional operations.

The device receives (700) a first authentication request that includes an image (e.g., a reference image 300, such as an identification document, and/or an authentication image 350. The device determines (702) a risk value using one or more information factors that correspond to the authentication request (e.g., information that identifies a location (e.g., physical address, city, and/or country) in which the authentication request originated, information that identifies a requester (e.g., an entity that corresponds to requesting device 154 or user device 156), a document type that corresponds to the image (e.g., an identification document type such as a passport, driver's license, credit card, debit card, or facility access card), and/or a channel via which the authentication request was received (e.g., web, mobile application, mobile website, or mobile point-of-sale)). In some embodiments, a first weight is applied to information that identifies a location in which the authentication request originated, a second weight is applied to information that identifies a requester, a third weight is applied to a document type, and a fourth weight is applied to a channel via which the authentication request was received. In some embodiments, the first weight, second weight, third weight, and/or fourth weight are adjusted (e.g., adjusted periodically and/or in response to a determined change in fraud rate that exceeds a threshold fraud rate). For example, one or more of the weights can be adjusted based on analysis of the rates of occurrence of the one or more information factors in authorization requests determined to be fraudulent.

The device displays (704) a validation user interface 222 that includes the image.

In some embodiments, the device analyzes the image, and, based on the analysis, determines at least one risk feature that corresponds to the image. For example, the risk feature can include a facial image, a portion of a facial image (e.g., a feature of a face that is present in a reference image 300 that is not present in authentication image 350, a feature of a facial image that does not conform to document requirements), and/or document text (e.g., a date that is earlier than the prior date by more than a threshold amount or text that does not have the correct font for the document type). In some embodiments, the device displays a risk feature indication that corresponds to the at least one risk feature. In some embodiments, the risk feature indication includes a visual alteration of the image of the identification document (e.g., an outline surrounding the risk feature, an arrow pointing to the risk feature, or an altered brightness or coloration applied to an area surrounding the risk feature). In some embodiments, analyzing the image includes detecting text in the image. In some embodiments, the risk feature indication includes an alteration of text (e.g., underline, bolding, italicizing, or highlighting) detected in the image of the identification document.

The device determines, using at least a first risk threshold, a risk category that corresponds to the risk value. For example, the device determines (706) whether the determined risk value corresponds to the first risk category. In accordance with a determination (708) that the risk value corresponds to a first risk category (e.g., the risk value is equal to or below the first risk threshold), a visual indication that corresponds to the first risk category can be displayed (e.g., background 408, allotted time value 410, and/or review input region 412 as described with regard to FIG. 4). In some embodiments, the method proceeds from 708 to 716, as indicated by D in FIGS. 7A and 7C.

Figure 7A:
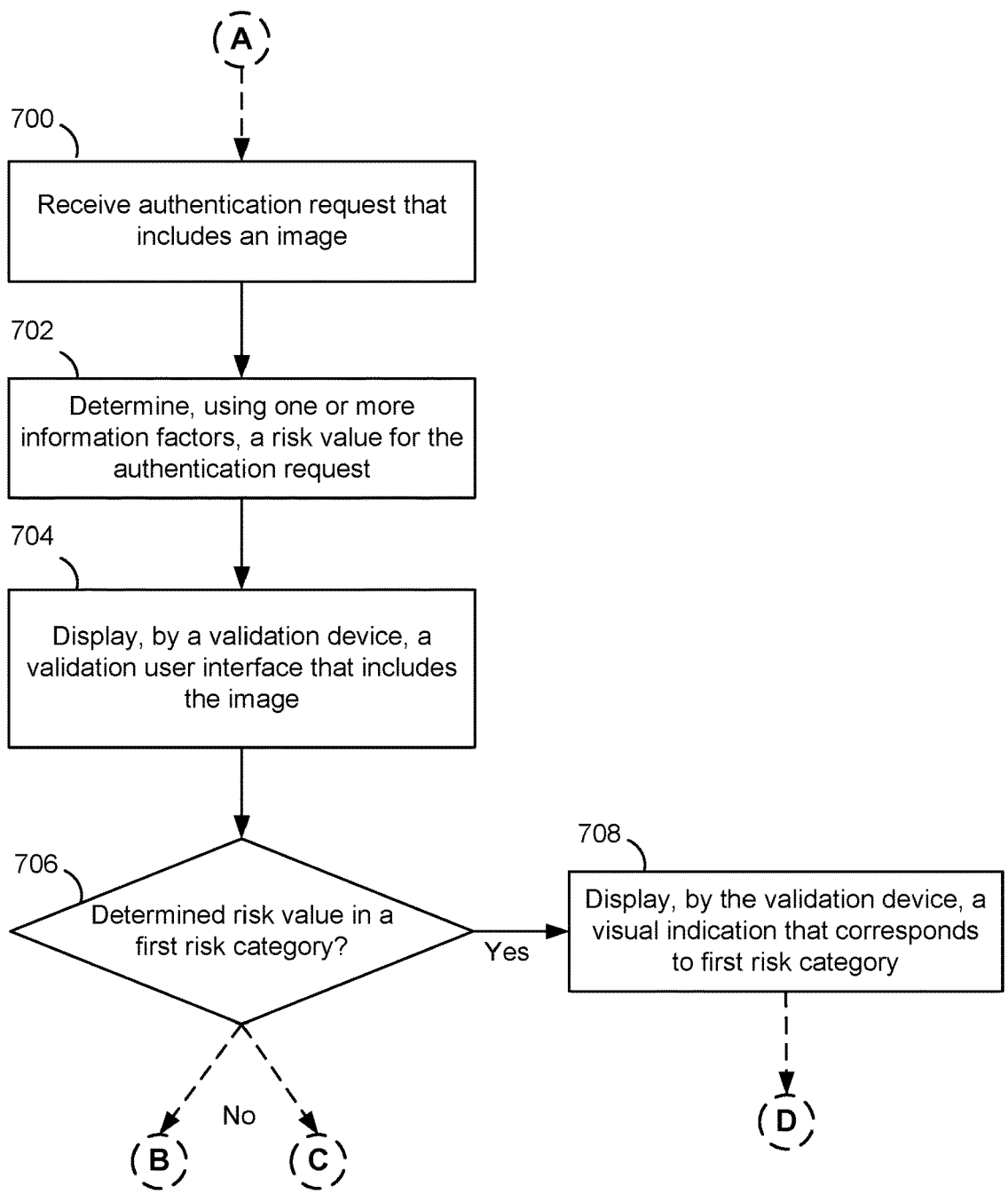
FIGS. 7A-7C are flow diagrams illustrating a method for providing a visual indication of risk category, in accordance with some embodiments.
Figure 7B:
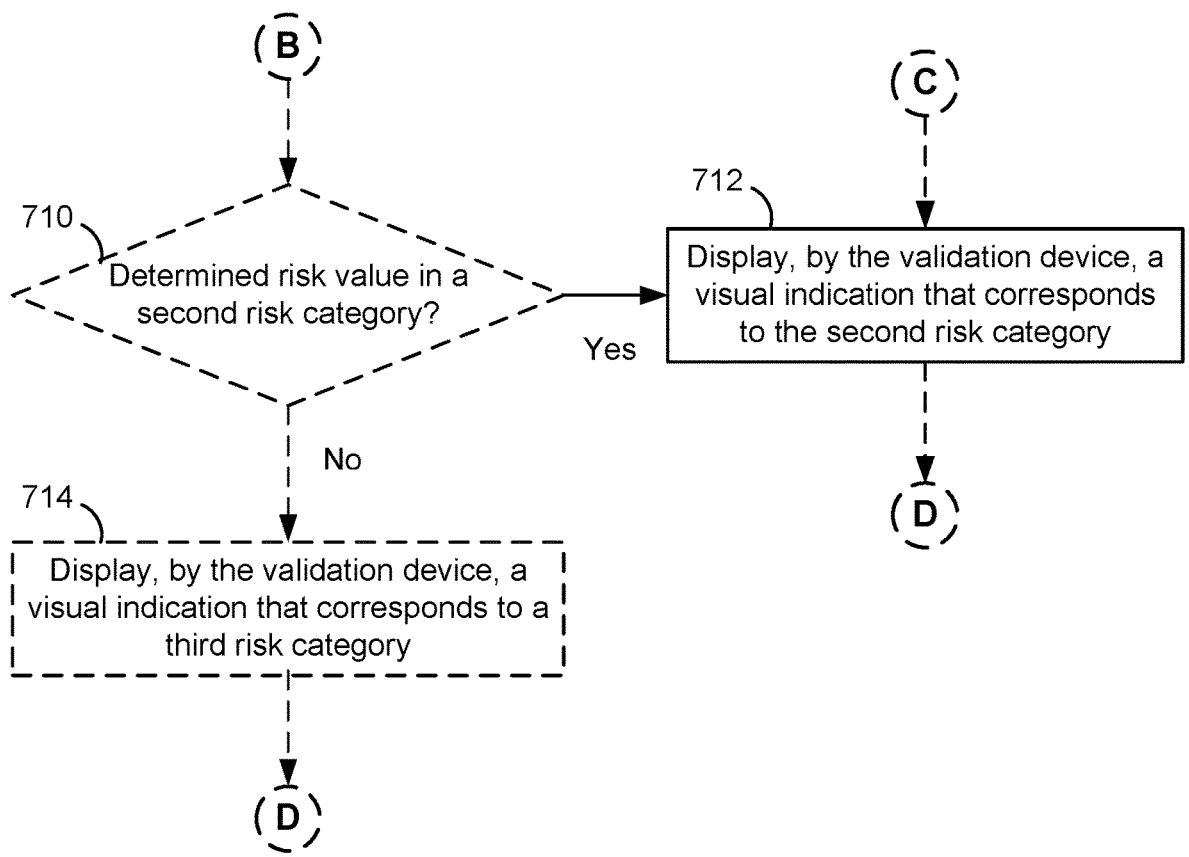

In some embodiments, in accordance with a determination that the risk value does not correspond a first risk category, the method proceeds to 710, as indicated by B in FIGS. 7A-7B. In some embodiments, in accordance with a determination that the risk value does not correspond a first risk category, the method proceeds to 712, as indicated by C in FIGS. 7A-7B.

In some embodiments, the device determines (710) whether the determined risk value corresponds to a second risk category. In accordance with a determination that the risk value corresponds to a second risk category (e.g., the risk value exceeds the first risk threshold and is less than a second risk threshold), the method proceeds to 712. In accordance with a determination that the risk value does not correspond a second risk category (e.g., the risk value is equal to or greater than the second risk threshold), the method proceeds to 714.

At 712, the device displays a visual indication that corresponds to the second risk category (e.g., background 408, allotted time value 410, and/or review input region 412 as described with regard to FIG. 5). In some embodiments, the method proceeds from 712 to 716, as indicated by D in FIGS. 7B-7C.

At 714, the device displays a visual indication that corresponds a third risk category (e.g., background 408, allotted time value 410, and/or review input region 412 as described with regard to FIG. 6). In some embodiments, the method proceeds from 714 to 716, as indicated by D in FIGS. 7B-7C.

In some embodiments, displaying the visual indication (e.g., a visual indication that corresponds to the second risk category and/or the third risk category) includes displaying an indicator (e.g., indicator 416 as shown in FIG. 6) overlaying the validation user interface 222. In some embodiments, displaying the validation user interface includes displaying a first evaluation input control (the input control that corresponds to "Check issue #1" and/or the input control that corresponds to "Check issue #2," as shown in FIG. 5) and the visual indication includes displaying at least one additional evaluation input control (e.g., the input control that corresponds to "Check issue #3," as shown in FIG. 6). In some embodiments, in accordance with the determination that the risk value corresponds to a second risk category, a time allotment for evaluation of the authentication request is increased (e.g., from a default time allotment for evaluation of the authentication request and/or from a time allotment that corresponds to the first risk category). For example, in FIG. 4, the validation user interface 222 that corresponds to a low risk (e.g., first risk category) authentication request displays an allotted time value 410 of 0:20, and in FIG. 5, the validation user interface 222 that corresponds to a medium risk (e.g., second risk category) authentication request displays an allotted time value 410 that has been increased to 0:45. In some embodiments, the displayed visual indication includes the altered time allotment 410.

In some embodiments, the device analyzes (716) one or more sets of received authentication requests. In some embodiments, the device adjusts (718) the first risk threshold based on at least one analyzed set of received authentication requests. For example, the first risk threshold is adjusted based on an analyzed first set of received authentication requests. In some embodiments, the device adjusts (720) the second risk threshold based on at least one analyzed set of received authentication requests. For example, the second risk threshold is adjusted based on the analyzed first set of received authentication requests.

In an illustrative example, a target distribution of authentication requests assigns risk levels to authentication requests such that 15% of authentication requests correspond to a first risk category (e.g., a low risk category), 70% of authentication requests correspond to a second risk category (e.g., a medium risk category), and 15% of authentication requests correspond to a third risk category (e.g., a high risk category). A set of authentication requests is analyzed (e.g., in response to a request to analyze a set of authentication requests and/or on a periodic basis (e.g., hourly or daily)) to determine whether a first risk threshold and/or second threshold produces the target percentage of authentication requests in the first risk category, the second risk category, and the third risk category. In accordance with a determination that the percentage of authentication requests in the first risk category deviates from a target percentage of authentication requests that fall into the first risk category (e.g., by more than a threshold amount), the first risk threshold can be adjusted. In accordance with a determination that the percentage of authentication requests in the second risk category deviates from a target percentage of authentication requests that fall into the second risk category (e.g., by more than a threshold amount), the first risk threshold and/or the second risk threshold can be adjusted. In accordance with a determination that the percentage of authentication requests in the third risk category deviates from a target percentage of authentication requests that fall into the third risk category (e.g., by more than a threshold amount), the second risk threshold can be adjusted.

In some embodiments, the device adjusts (722) at least one weight applied to a respective information factor of the one or more information factors based on at least one analyzed set of received authentication requests (e.g., in response to a request to analyze a set of authentication requests and/or on a periodic basis (e.g., hourly or daily)). For example, at least one weight applied to a respective information factor of the one or more information factors is adjusted based on an analyzed second set of received authentication requests (that is the same as the first set of received authentication requests or that is distinct from the first set of received authentication requests). In an illustrative example, in accordance with a determination that the information that identifies a location in which the authentication request originated most strongly correlates with authentication requests determined to be fraudulent, a weight that corresponds to information that identifies a location in which the authentication request originated can be increased (and/or a weight that corresponds to other information factors can be decreased).

Figure 7C:
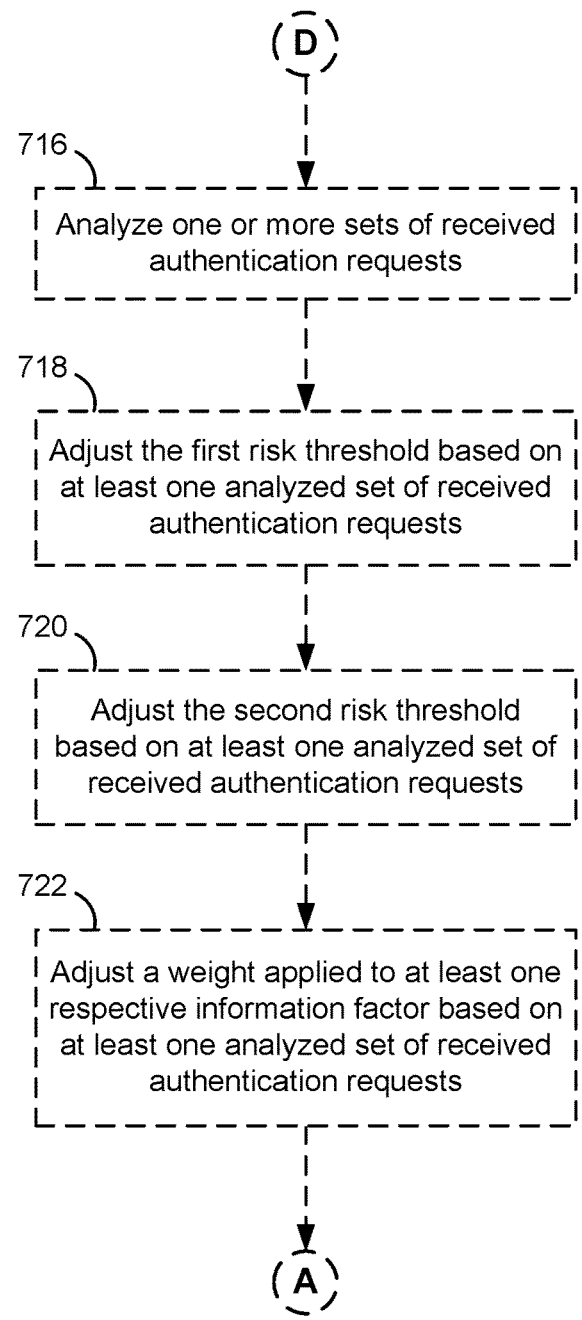

In some embodiments, the method proceeds from 722 to 702, as indicated by A in FIGS. 7C and 7A.

In some embodiments, in accordance with a determination that a risk value determined for an authentication request is below a minimum risk threshold (e.g., that is lower than the first risk threshold), the authentication is determined (e.g., automatically determined) to be successful (allowing one or more of operations 704-714 to be bypassed). For example, a risk category that corresponds to the risk value is determined using a minimum risk threshold in addition to the first risk threshold and/or the second risk threshold. A minimum risk category corresponds to a risk value below the minimum risk threshold. In some embodiments, in accordance with a determination that the risk value corresponds to the minimum risk category, the device transmits authentication confirmation information (e.g., to the requesting device) and/or forgoes displaying the validation user interface 222 that includes the image.

Displaying a visual indication that corresponds to a risk category (e.g., by a displayed background color and/or an indication of allotted time) creates a more efficient validation user interface by enhancing feedback provided to the user and reducing input error. Reducing input error improves the speed with which authentication requests are processed, reducing power consumption by the authentication system.

Figure 8:
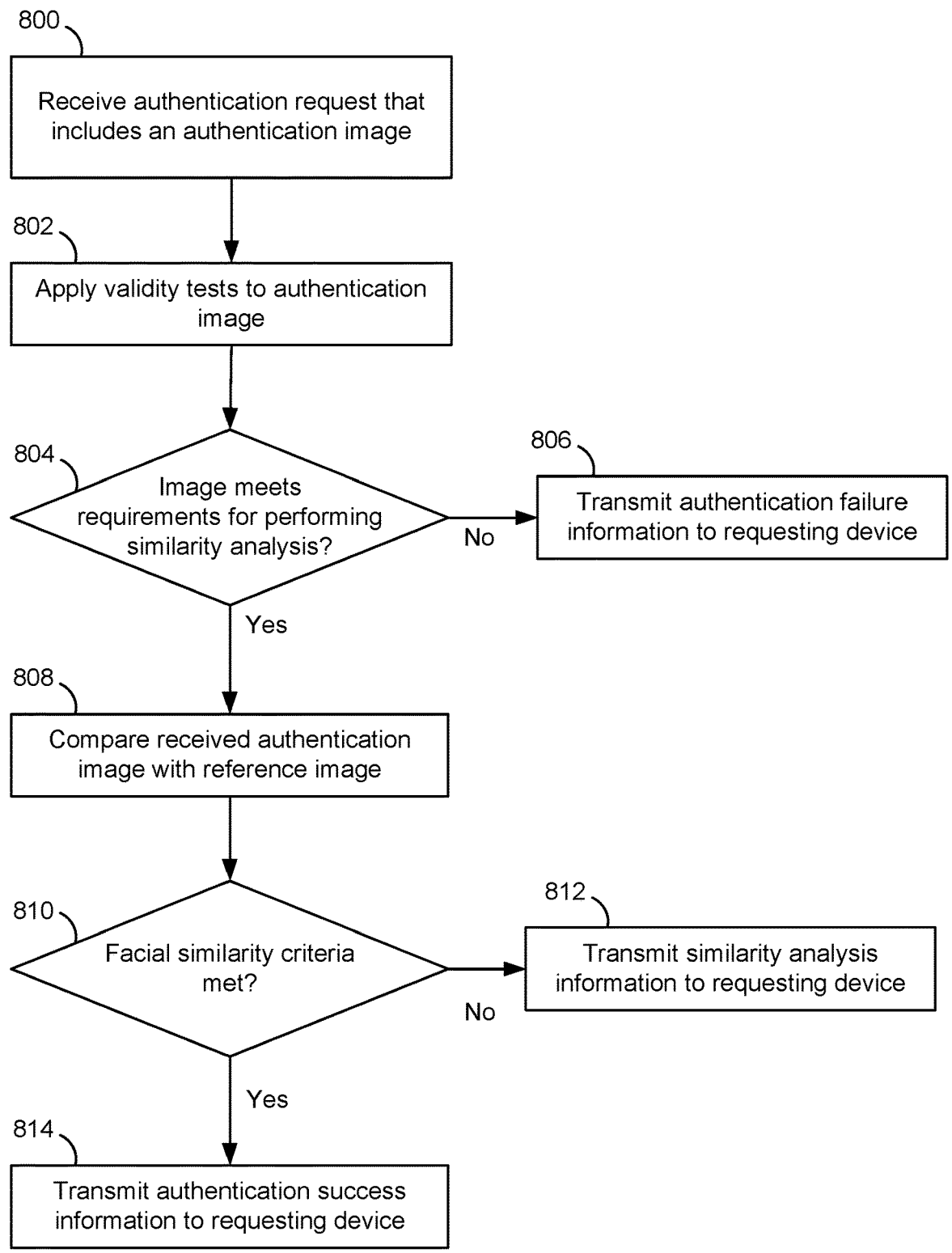
FIG. 8 is a flow diagram illustrating a method for determining whether to perform image similarity analysis, in accordance with some embodiments.

FIG. 8 is a flow diagram illustrating a method for determining whether to perform image similarity analysis, in accordance with some embodiments. The method is performed at a server 100 and/or a validation device 200. For example, instructions for performing the method are stored in the memory 102 and executed by the processor(s) 104 of the server computer system 100. In some embodiments, part or all of the instructions for performing the method are stored in the memory 202 and executed by the processor(s) 204 of the validation device 200.

The device receives (800) an authentication request that includes an authentication image 350. In some embodiments, the authentication request also includes a reference image 300.

As discussed below, the device determines (802) results of a plurality of image validity tests applied to the received authentication image 350.

Figure 9:
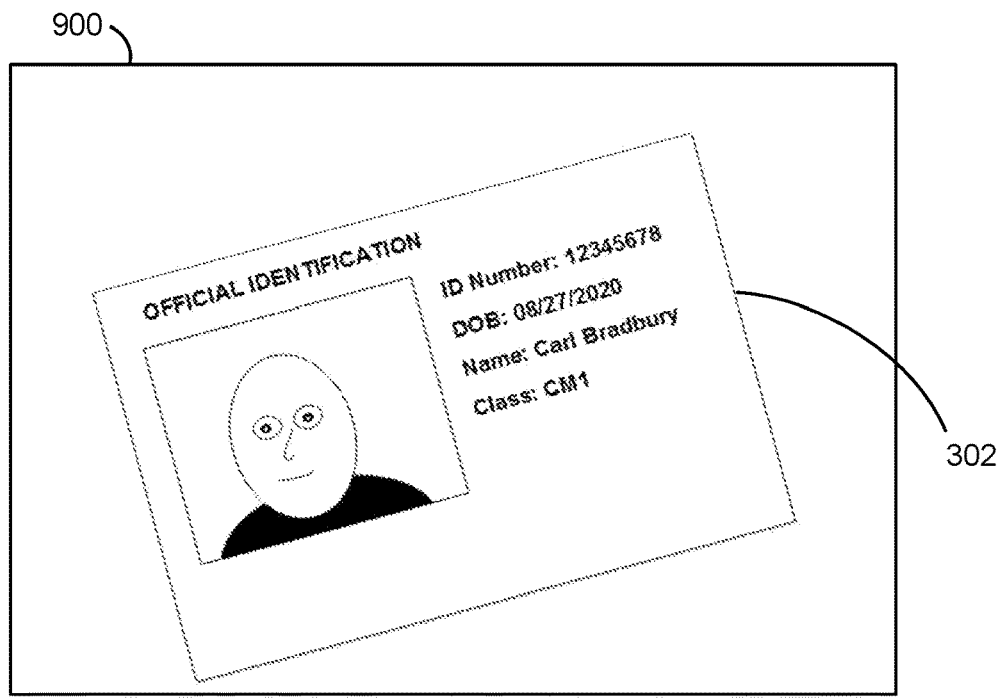
FIG. 9 is an illustrative example of a received image that includes an entire identification document, in accordance with some embodiments.
Figure 10:
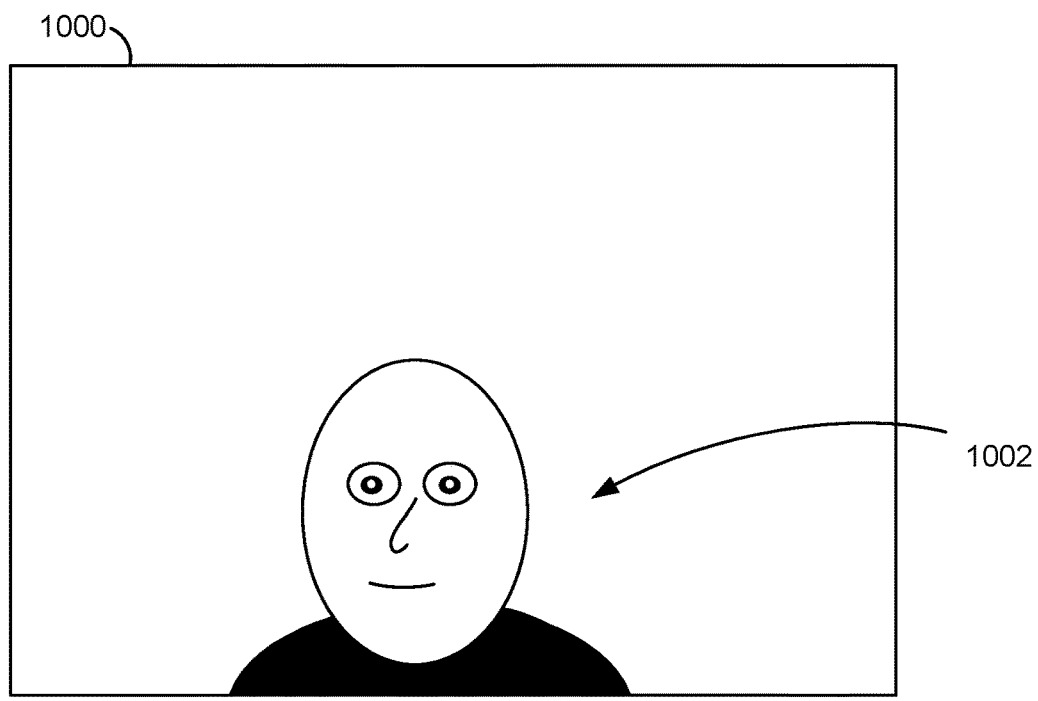
FIG. 10 is an illustrative example of a received image that includes a facial image that has been cropped from identification document, in accordance with some embodiments.

In some embodiments, determining the results of the plurality of image validity tests includes determining whether the received authentication image 350 is derived from the reference image 300 (e.g., the received image is cropped from the identification document, the entire identification document is included in the received image, and/or the received image is an altered version of the identification document image). For example, FIG. 9 is an illustrative example of a received image 900 that includes an entire identification document 302, in accordance with some embodiments. FIG. 10 is an illustrative example of a received image 1000 that includes a facial image 1002 that has been cropped from identification document 302, in accordance with some embodiments. Images 900 and 1000 are invalid because a proper authentication image 350 must be a different image of a user 124 (e.g., a recent "selfie" image of the user 124) from the image of user 124 captured in the reference image 300 (e.g., an image of the user 124 from an identification document).

In some embodiments, determining results of a plurality of image validity tests includes determining whether facial image criteria are met. In some embodiments, the facial image criteria include a requirement that exactly one entire human face is present in the received authentication image 350 (e.g., the image must include a single face (not multiple faces), a sufficiently whole face (not a partial face), and a human face (not an animal face)). In some embodiments, the facial image criteria include a requirement that no filter and/or mask is applied to a facial image 352 in the authentication image 350.

In some embodiments, determining whether the plurality of image validity criteria are met includes determining whether an amount of glare in the received authentication image 350 meets image glare criteria (e.g., whether the amount of glare in authentication image 350 exceeds a threshold level of glare). In some embodiments, the set of one or more requirements for performing a similarity analysis include a requirement that the amount of glare in the received authentication image 350 meets the image glare criteria.

In some embodiments, determining whether the plurality of image validity criteria are met includes determining whether a quality parameter of a photograph (e.g., contrast, resolution, and/or size of facial image) is met.

In some embodiments, the device receives a reference image 300 (e.g., included in the authentication request). In some embodiments, determining whether the plurality of image validity criteria are met includes determining whether an age difference between the facial image 304 in the reference image 300 and the facial image 352 in the authentication image 350 exceeds an allowable age difference.

In some embodiments, determining results of one or more first respective image validity tests of the plurality of image validity tests includes analyzing, by image analysis module 132, the received authentication image 350. In some embodiments, determining results of one or more second respective image validity tests of the plurality of image validity tests includes transmitting, to a verification device 200, the received authentication image 350 (e.g., for analysis and/or display by the verification device 200) and receiving, from the verification device 200, an indication of the results of the one or more second respective image validity tests (e.g., individual indications of image validity tests passed and/or failed, and/or an indication that all image validity tests were passed). In some embodiments, determining the results of the one or more second respective image validity tests of the plurality of image validity tests includes transmitting, to the verification device 200, the reference image 300. In some embodiments, (e.g., prior to displaying the received authentication image 350 and/or the reference image 300 by verification device 200), a risk value for the authentication request is determined (e.g., as described with regard to FIGS. 7A-7C) and the verification device 200 displays a visual indication that corresponds to a risk category determined using the risk value.

The device determines (804), using the results of at least a subset of the image validity tests, whether the received first image meets a set of one or more requirements for performing a similarity analysis. In accordance with a determination that the received first image does not meet the set of one or more requirements for performing a similarity analysis, the method proceeds to 806. In accordance with a determination that the received first image meets the set of one or more requirements for performing a similarity analysis, the method proceeds to 808.

At 806, the device transmits authentication failure information to requesting device 154. For example, the authentication failure information includes information regarding one or more of the plurality of image validity tests that the first image did not pass.

At 808, at least a portion of a reference image 300 is compared with at least a portion of the received authentication image 350. In some embodiments, comparing at least a portion of a reference image 300 with at least a portion of the received authentication image 350 includes displaying, by a display of validation device 200, at least a portion of the reference image 300 (e.g., a portion that corresponds to a location of a facial image within the reference image 300) and at least a portion of the authentication image 350 (e.g., a portion that corresponds to a location of a facial image within the authentication image 350) and receiving input that indicates similarity information (e.g., an indication that the reference image matches the authentication image 350 and/or information regarding one or more similarity analysis parameters). In some embodiments, similarity analysis module 136 of server 100 compares at least a portion of a reference image 300 with at least a portion of the received authentication image 350. Based on the comparison of operation 808, the device determines (810) whether facial similarity criteria are met. In accordance with a determination that the facial similarity criteria are not met, the method proceeds to 812. In accordance with a determination that the facial similarity criteria are met, the method proceeds to 814.

In some embodiments, determining results of the plurality of image validity tests includes determining a portion of the received authentication image 350 that corresponds to a first facial image (e.g., facial image 352) and determining whether the facial similarity criteria are met includes comparing a portion of the reference image 300 that corresponds to a second facial image (e.g., facial image 304) with the determined portion of the received authentication image 350 that corresponds to the first facial image.

At 812, the device transmits similarity analysis information to the requesting device 154 (e.g., information indicating authentication failure, similarity analysis failure, and/or an outcome of one or more similarity analysis parameter evaluations).

At 814, the device transmits authentication success information to the requesting device. For example, authentication success information includes information indicating that the authentication analysis was successful and/or information that indicates the results of the validity analysis of 802-804 and/or the similarity analysis of 808-810.

Applying a plurality of image validity tests to a received image to determine whether the received image meets one or more requirements for performing a similarity analysis reduces the time and processing power required to determine authentication success for authentication request (e.g., by eliminating the time required for performing a similarity analysis for authentication requests that include invalid images).

In some embodiments, prior to applying the validity tests to the authentication image 350 (as described with regard to operation 802), the device determines whether a liveness test is available. A liveness test is described further below with regard to FIGS. 11A-11B and 12A-12B. In some embodiments, in accordance with a determination that the liveness test is available (and/or in accordance with a determination that the results of a liveness test are successful) the authentication system 100 forgoes applying the validity tests (e.g., bypassing operations 802-804 and proceeding to operation 808).

FIGS. 11A-11B and 12A-12B illustrate user interfaces and captured images associated with liveness assessments, in accordance with some embodiments. For example, a liveness assessment assesses movement of a person that occurs in response to an instruction that is output by a user device 156 (e.g., displayed by a display of user device 156 or output by a speaker of user device 156). In some embodiments, a liveness assessment aids in a determination that a received authentication request originates from a user 124 that is a live individual capable of particular movements in response to instructions. In some embodiments, the displayed instruction is randomly, pseudorandomly, or cyclically generated (e.g., so that a user must respond in real time to a prompt that is not predictable prior to initiation of the authentication request). FIGS. 11A-11B and 12A-12B illustrate use of eye-tracking to for liveness assessment.

Figure 11A:
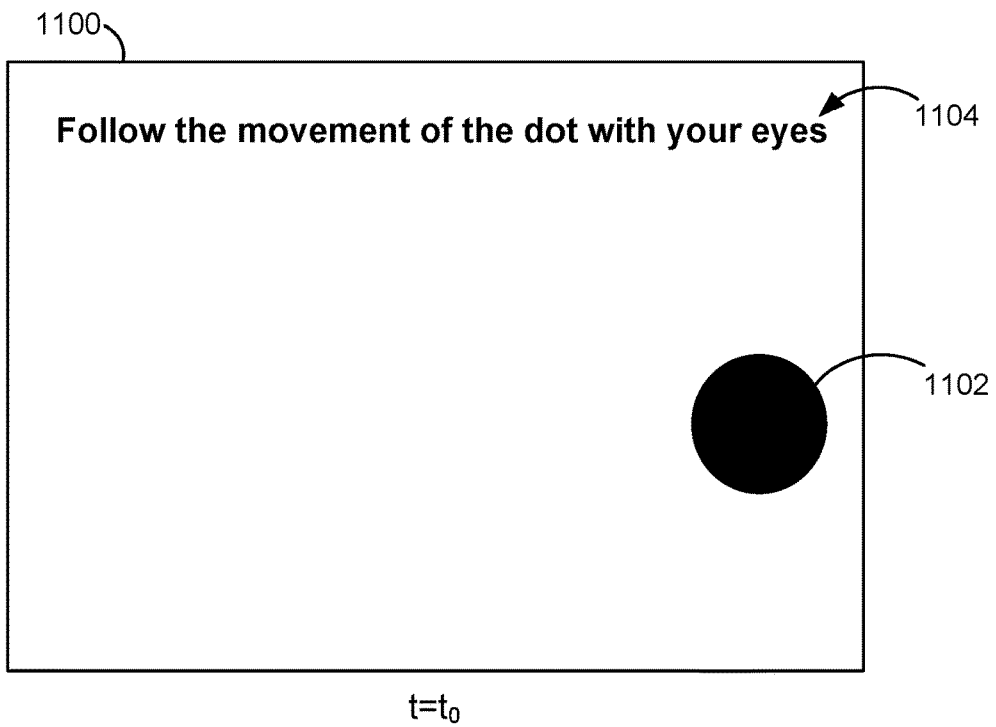
FIG. 11A illustrates a first state of a user interface that displays a moving target for liveness verification, in accordance with some embodiments.
Figure 12A:
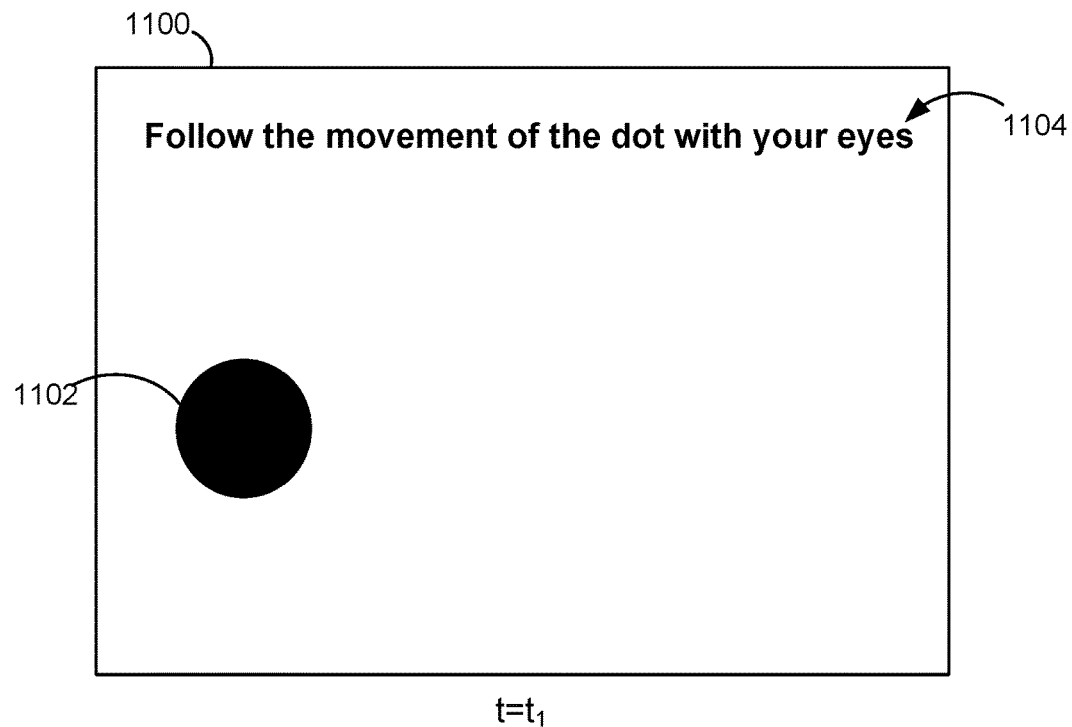
FIG. 12A illustrates a second state of a user interface that displays a moving target for liveness verification, in accordance with some embodiments.

FIGS. 11A and 12A illustrate a user interface 1100 (e.g., a user interface displayed by user device 156) that displays a moving target 1102 for liveness verification, in accordance with some embodiments. FIG. 11A illustrates a first state of the user interface 1100, which is displayed at a first time ($t_0$) and FIG. 12A illustrates a second state of the user interface 1100 as displayed at a second time ($t_1$), which is later than the first time. In some embodiments, the moving target 1102 is an animated image, such as an animated dot. In some embodiments, the moving target 1102 moves across the user interface 1100 (e.g., side-to-side, as shown in FIGS. 11A and 12A, vertically, diagonally, sinusoidally, and/or along another path). In some embodiments, the path of movement of the moving target 1102 is a pre-defined path, a randomly-generated path, a pseudorandomly generated path, or a path that is randomly, pseudorandomly, or cyclically selected from a pre-defined set of paths. In some embodiments, the user interface 1100 displays a prompt (e.g., instructive text 1104) to provide instructions to a user 124 for moving a facial feature to satisfy the liveness criteria.

Figure 11B:
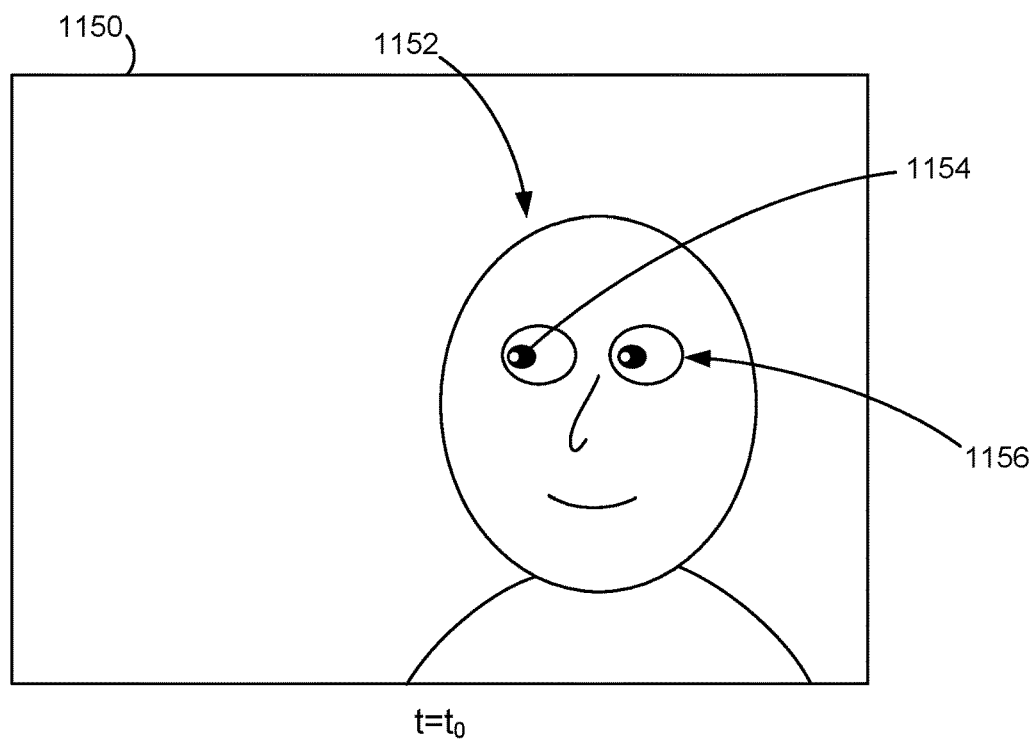
FIG. 11B illustrates an image that is captured while the moving target of FIG. 11A is displayed, in accordance with some embodiments.
Figure 12B:
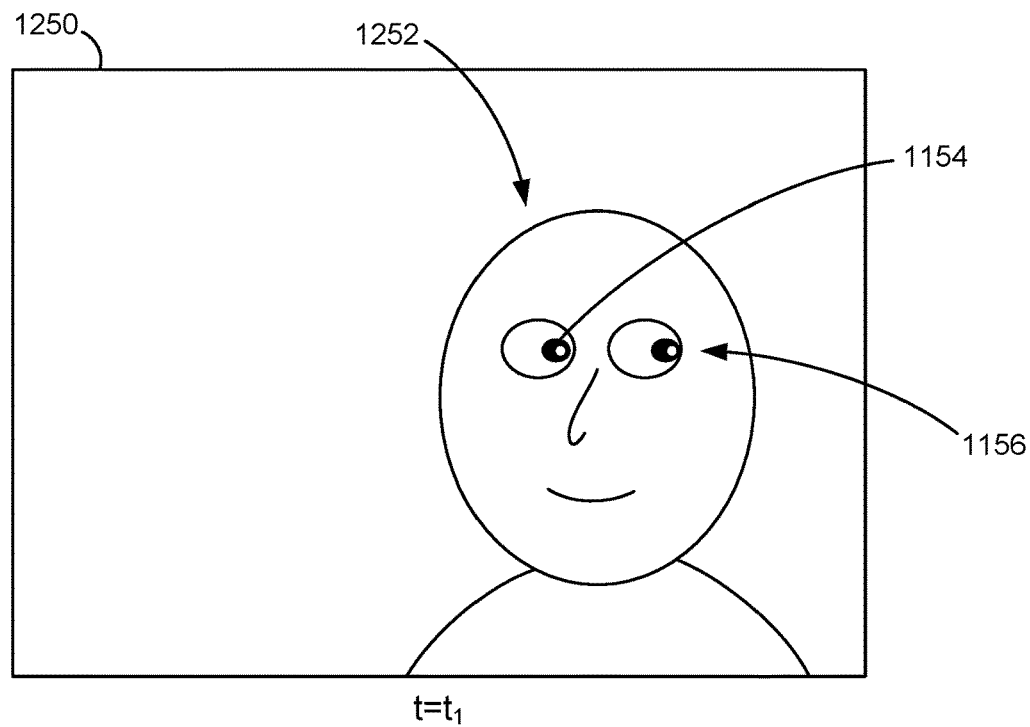
FIG. 12B illustrates an image that is captured while the moving target of FIG. 12A is displayed, in accordance with some embodiments.

FIGS. 11B and 12B illustrate captured images (1150, 1250) that are captured at the first time ($t_0$) and the second time ($t_1$), respectively, while the user interface 1100 is displayed. In some embodiments, the captured images 1150 and 1250 are frames of a video or still images captured by a camera (e.g., a front-facing camera of user device 156). The captured images 1150 and 1250 include a first facial image 1152 and a second facial image 1252, respectively, of the user 124. In some embodiments, one or more facial features (e.g., one or more parts of one or both eyes 1156, such as pupils, retinas, and/or irises 1154) of the user 124 are tracked. For example, a change in the position of the one or more facial features from the first image 1150 to the second image 1250 is determined and compared to a path of movement of the moving target 1102 displayed in the user interface 1100. In this way, a user 124 provides liveness verification by moving one or more facial features (e.g., changing a direction of view of the user's eyes 1156) in accordance with the path of movement of the moving target 1102.

Features of the present invention can be implemented in, using, or with the assistance of a computer program product, such as a storage medium (media) or computer readable storage medium (media) having instructions stored thereon/in which can be used to program a processing system to perform any of the features presented herein. The storage medium (e.g., the memory 102 and the memory 202) can include, but is not limited to, high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. In some embodiments, the memory 102 and the memory 202 include one or more storage devices remotely located from the CPU(s) 104 and 204. The memory 102 and the memory 202, or alternatively the non-volatile memory device(s) within these memories, comprises a non-transitory computer readable storage medium.

Communication systems as referred to herein (e.g., the communication system 108 and the communication system 208) optionally communicate via wired and/or wireless communication connections. Communication systems optionally communicate with networks (e.g., the networks 150 and 152), such as the Internet, also referred to as the World Wide Web (WWW), an intranet and/or a wireless network, such as a cellular telephone network, a wireless local area network (LAN) and/or a metropolitan area network (MAN), and other devices by wireless communication. Wireless communication connections optionally use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 102.11a, IEEE 102.11ac, IEEE 102.11ax, IEEE 102.11b, IEEE 102.11g and/or IEEE 102.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A computer-implemented method, comprising:
   at a server system including one or more processors and memory storing one or more programs for execution by the one or more processors:
   receiving a first authentication request that includes an image of an identification document;
   determining a risk value for the authentication request using one or more information factors that correspond to the authentication request, wherein the one or more information factors are distinct from the identification document;
   displaying, by a display of a validation device, a validation user interface that includes the image of the identification document;
   determining, using at least a first risk threshold, a risk category that corresponds to the risk value;
   in accordance with a determination that the risk value corresponds to a first risk category, displaying, by the display of the validation device, a visual indication that corresponds to the first risk category; and in accordance with a determination that the risk value corresponds to a second risk category, displaying, by the display of the validation device, a visual indication that corresponds to the second risk category, and increasing a time allotment for evaluation of the authentication request.

2. The method of claim 1, wherein the one or more information factors that correspond to the authentication request include at least one of:
information that identifies a location in which the authentication request originated,
information that identifies a requester,
a document type that corresponds to the identification document, or
a channel via which the authentication request was received.

3. The method of claim 2, including:
analyzing a first set of authentication requests; and
determining, based on the analyzed first set of authentication requests, whether to adjust at least one weight applied to a respective information factor of the one or more information factors.

4. The method of claim 3, including:
analyzing a second set of authentication requests; and
adjusting the first risk threshold based on the analyzed first set of authentication requests.

5. The method of claim 1, wherein:
the risk category that corresponds to the risk value is determined using a second risk threshold in addition to the first risk threshold;
the first risk category corresponds to a risk value below the first risk threshold;
the second risk category corresponds to a risk value between the first risk threshold and the second risk threshold; and
a third risk category corresponds to a risk value above the second risk threshold.

6. The method of claim 1, wherein:
the risk category that corresponds to the risk value is determined using a minimum risk threshold in addition to the first risk threshold;
a minimum risk category corresponds to a risk value below the minimum risk threshold; and
in accordance with a determination that the risk value corresponds to the minimum risk category, forgoing displaying, by the display of the validation device, the validation user interface that includes the image of the identification document; and
transmitting authentication confirmation information.

7. The method of claim 1, wherein displaying the visual indication includes displaying an indicator overlaying the validation user interface.

8. The method of claim 1, wherein:
displaying the validation user interface includes displaying a first evaluation input control; and
the visual indication includes altering the first evaluation input control.

9. The method of claim 1, wherein:
displaying the validation user interface includes displaying a second evaluation input control; and
the visual indication includes displaying at least one additional evaluation input control.

10. The method of claim 1, wherein the visual indication includes the increased time allotment.

11. The method of claim 1, including:
analyzing the image of the identification document; and
determining, based on the ysis of the image of the identification document, at least one risk feature; and
displaying, by the display of the validation device, a risk feature indication that corresponds to the at least one risk feature.

12. The method of claim 11, wherein the risk feature indication includes a visual alteration of the image of the identification document.

13. The method of claim 11, wherein:
analyzing the image of the identification document includes detecting text in the image of the identification document; and
the risk feature indication includes an alteration of the text detected in the image of the identification document.

14. A computer readable storage medium storing one or more programs, the one or more programs comprising instructions, which when executed, cause a device to:
receive a first authentication request that includes an image of an identification document;
determine a risk value for the authentication request using one or more information factors that correspond to the authentication request, wherein the one or more information factors are distinct from the identification document;
display, by a display of a validation device, a validation user interface that includes the image of the identification document;
determine, using at least a first risk threshold, a risk category that corresponds to the risk value;
in accordance with a determination that the risk value corresponds to a first risk category, displaying, by the display of the validation device, a visual indication that corresponds to the first risk category; and
in accordance with a determination that the risk value corresponds to a second risk category, display, by the display of the validation device, a visual indication that corresponds to the second risk category, and increase a time allotment for evaluation of the authentication request.

15. The computer readable storage medium of claim 14, wherein the one or more information factors that correspond to the authentication request include at least one of:
information that identifies a location in which the authentication request originated,
information that identifies a requester,
a document type that corresponds to the identification document, or
a channel via which the authentication request was received.

16. The computer readable storage medium of claim 15, wherein the one or more programs include instructions that cause the device to:
analyze a first set of authentication requests; and
determine, based on the analyzed first set of authentication requests, whether to adjust at least one weight applied to a respective information factor of the one or more information factors.

17. The computer readable storage medium of claim 14, wherein the one or more programs include instructions that cause the device to:
analyze a second set of authentication requests; and
adjust the first risk threshold based on the analyzed first set of authentication requests.

18. The computer readable storage medium of claim 14, wherein:
- the risk category that corresponds to the risk value is determined using a second risk threshold in addition to the first risk threshold;
- the first risk category corresponds to a risk value below the first risk threshold;
- the second risk category corresponds to a risk value between the first risk threshold and the second risk threshold; and
- a third risk category corresponds to a risk value above the second risk threshold.

19. A system, comprising:
- one or more processors;
- memory; and
- one or more programs, wherein the one or more programs are stored in the memory and are configured for execution by the one or more processors, the one or more programs including instructions for:
  - receiving a first authentication request that includes an image of an identification document;
  - determining a risk value for the authentication request using one or more information factors that correspond to the authentication request, wherein the one or more information factors are distinct from the identification document;
  - displaying, by a display of a validation device, a validation user interface that includes the image of the identification document;
  - determining, using at least a first risk threshold, a risk category that corresponds to the risk value;
  - in accordance with a determination that the risk value corresponds to a first risk category, displaying, by the display of the validation device, a visual indication that corresponds to the first risk category; and
  - in accordance with a determination that the risk value corresponds to a second risk category, displaying, by the display of the validation device, a visual indication that corresponds to the second risk category, and increasing a time allotment for evaluation of the authentication request.

20. A computer-implemented method, comprising:
at a server system including one or more processors and memory storing one or more programs for execution by the one or more processors:
- receiving a first authentication request that includes an image of an identification document;
- determining a risk value for the authentication request using one or more information factors that correspond to the authentication request;
- displaying, by a display of a validation device, a validation user interface that includes the image of the identification document;
- determining, using at least a first risk threshold, a risk category that corresponds to the risk value, wherein the risk category is one of a plurality of risk categories that includes a low risk category, a medium risk category, and a high risk category;
- in accordance with a determination that the risk value corresponds to a first risk category, displaying, by the display of the validation device, a visual indication that corresponds to the first risk category; and
- in accordance with a determination that the risk value corresponds to a second risk category, displaying, by the display of the validation device, a visual indication that corresponds to the second risk category, and increasing a time allotment for evaluation of the authentication request.

* * * * *

UNITED STATES PATENT AND TRADEMARK OFFICE
CERTIFICATE OF CORRECTION

PATENT NO. : 10,728,241 B2
APPLICATION NO. : 15/881418
DATED : July 28, 2020
INVENTOR(S) : Pointner et al.

Page 1 of 1

It is certified that error appears in the above-identified patent and that said Letters Patent is hereby corrected as shown below:

In the Claims

Claim 11, Column 18, Line 3, please delete "based on the ysis of the image" and insert --based on the analysis of the image--.

Signed and Sealed this
Twenty-second Day of September, 2020

Andrei Iancu
*Director of the United States Patent and Trademark Office*